United States Patent
Sherman et al.

(10) Patent No.: US 6,704,483 B2
(45) Date of Patent: Mar. 9, 2004

(54) LARGE OPTICAL FIBER ARRAY ASSEMBLY AND METHOD

(75) Inventors: Jonathan Sherman, Caldwell, ID (US); Irfan Camlibel, Bedminster, NJ (US); Theodore C. Rich, Basking Ridge, NJ (US); Ernest J. Rich, Princeton, NJ (US)

(73) Assignee: Fiberguide Industries, Inc., Stirling, NJ (US)

( * ) Notice: Subject to any disclaimer, the term of this patent is extended or adjusted under 35 U.S.C. 154(b) by 45 days.

(21) Appl. No.: 10/164,912

(22) Filed: Jun. 7, 2002

(65) Prior Publication Data

US 2002/0197019 A1 Dec. 26, 2002

Related U.S. Application Data

(63) Continuation of application No. 09/841,686, filed on Apr. 24, 2001, now Pat. No. 6,470,123, which is a continuation-in-part of application No. 09/618,179, filed on Jul. 18, 2000, now abandoned.

(51) Int. Cl.[7] .................................................. G02B 6/04
(52) U.S. Cl. ........................... 385/115; 385/52; 385/92; 385/137

(56) References Cited

U.S. PATENT DOCUMENTS

| | | | | |
|---|---|---|---|---|
| 4,812,002 A | * | 3/1989 | Kato et al. | 385/33 |
| 5,185,846 A | * | 2/1993 | Basavanhally et al. | 385/137 |
| 5,345,529 A | * | 9/1994 | Sizer, II et al. | 385/147 |
| 5,346,583 A | * | 9/1994 | Basavanhally | 216/26 |
| 5,566,262 A | * | 10/1996 | Yamane et al. | 385/33 |
| 5,620,634 A | * | 4/1997 | Shahid | 264/1.25 |
| 5,815,621 A | * | 9/1998 | Sakai et al. | 385/80 |
| 6,137,930 A | * | 10/2000 | Laughlin | 385/34 |
| 6,253,007 B1 | * | 6/2001 | Laughlin | 385/34 |
| 6,352,372 B1 | * | 3/2002 | Shahid | 385/59 |
| 6,364,529 B1 | * | 4/2002 | Dawson | 385/83 |
| 6,364,539 B1 | * | 4/2002 | Shahid | 385/83 |
| 6,393,187 B1 | * | 5/2002 | Engelberth et al. | 385/115 |
| 6,470,123 B1 | * | 10/2002 | Sherman et al. | 385/115 |
| 6,487,359 B2 | * | 11/2002 | Bruns | 385/14 |
| 2002/0131754 A1 | * | 9/2002 | Kaiser et al. | 385/137 |
| 2002/0150349 A1 | * | 10/2002 | Shahid | 385/65 |
| 2002/0154882 A1 | * | 10/2002 | Moran | 385/137 |

* cited by examiner

*Primary Examiner*—Akm Enayet Ullah
*Assistant Examiner*—Michelle R. Connelly-Cushua
(74) *Attorney, Agent, or Firm*—Edward Dreyfus, Esq.

(57) ABSTRACT

A high density optical fiber array assembly and assembly method includes a housing securing a front array mask etched with extreme precision to define openings arranged in a predetermined pattern. A series of guide plates form a series of fiber guide channels that align with the mask openings, which plates are stacked within the housing so that the bottom of one acts as a cover for the channels of another. Fibers can be tool inserted along the channels as one group, such as a row of fibers, or manually inserted and advanced sequentially. Alternately, the mask and guide plate stack are mounted to and within a mounting block and the mounting block assembly inserted into the assembly housing substantially all remaining voids in the housing are filled with bonding material.

34 Claims, 17 Drawing Sheets

LARGE OPTICAL FIBER ARRAY ASSEMBLY AND METHOD

RELATED APPLICATION

This is a continuation application of U.S. patent application Ser. No. 09/841,686 filed Apr. 24, 2001 now U.S. Pat. No. 6,470,123 which is a continuation-in-part application of U.S. patent application Ser. No. 09/618,179 filed Jul. 18, 2000 now abandoned having the same title, ownership, and inventorship.

BACKGROUND

The present invention relates to fiber optic arrays and more particularly to large, matrix configured arrays and the method and tools for making the same.

Fiberoptics has been the driving force in the communication revolution which has enabled carriers to achieve enormous data throughput. In order to realize the full potential of the technology, fiberoptics will be incorporated into every facet of the integrated electronics, which will then make it possible to fully utilize the enormous bandwidth of the optical fiber with the high speeds of the semiconductor integrated circuitry.

To this end, arrays of optical fibers need to be coupled precisely and reliably to semiconductor laser and detector arrays on a chip. Already, various groups throughout the world have demonstrated feasibility of high speed optoelectronic VLSI switching and two dimensional fiberoptic arrays for an optical crossbar switch.

In 1996, reports were published of achieving approximately + or – 5 micrometer fiber positional accuracy. In June 1997, Messrs. J. Sherman et al. filed and obtained on May 25, 1999 U.S. Pat. No. 5,907,650 by Fiberguide Industries, Inc. relating to a new method and array achieving at least + or – 2 micrometer fiber positional accuracy.

Although these advances in the art enhance the accuracy and reliability of fiber arrays, they introduce or amplify other technical problems that must be solved to satisfy industry's need for large number, reliable, high precision, fiber matrix arrays. For example, as the demand for the number of fibers in matrix arrays increases, from 8×8 just a few years ago to the present more than 60×60, assembly problems arise because of the difficulty in handling and positioning and securing the large number of fibers in the assembly.

SUMMARY OF EXEMPLARY EMBODIMENT OF THE PRESENT INVENTION

A primary object of the present invention is to provide new connector apparatus, tools and methods of assembly that solve the aforementioned problems, provide an efficient and reliable manufacturing method for such large element number arrays and produce such a fiber array connector matrix with highly accurate and reliable fiber placement that is sufficiently robust for further installation and use in the field.

Another primary object of the present invention is to provide such an optical array with enhanced precision compared to the known prior art, which can be effectively and efficiently manufactured, with lower unit costs than currently available products. One feature of this aspect of the invention is to provide a mating mask material with fiber mounting openings that are photo etched or otherwise precisely formed in predetermined patterns, such as rows and columns.

According to another primary object of the present invention, the jackets and buffer layers of fibers are stripped and the distal fiber ends are inserted through the openings and bonded to the mask. In a preferred embodiment, the fiber tip is conically shaped according to the principles of U.S. Pat. No. 5,907,650. The conical surface cooperates with the mask opening, as, e.g., described below, to enable more accurate fiber positioning. By conically shaping the fiber ends the insertion of the fiber into mask opening can be self limiting by having the fiber bottom against the mask opening side walls.

An exemplary embodiment according to principles of the present invention, includes an elongated housing or body securing a forward mask which defines a large number of mask openings arranged in a predetermined pattern, such as 60 rows by 60 columns or more. The connector housing serves several functions. The most important function is to provide protection and stability for the fibers. The connector also serves as the mechanical interface from the array assembly to the final instrument, and protects the fibers and the final instrument from the environment. This connector is designed to be hermetically sealed after the array is assembled.

The silicon wafer is etched with holes at designated centers, and because of the hole manufacturing process, the location of the hole centers can be held to extreme precision such as a tenth of a micron for 120–200 micron holes. The holes can be tapered to create a mating surface to both position the fiber and a bottoming wall surface for the tapered fibers to seat against. The mask wafer also has a series of holes that provide alignment for guide plate assembling and alignment to the connector.

The housing internal chamber defines precise guide elements to cooperate with a series of guide plates. Each guide plate forms a series of fiber guide channels or grooves that mate up with the holes in the silicon wafer. The guide plates are stacked within the housing so that the bottom of one guide plate acts as a cover for the channels of another guide plate. Preferably, the forward edges of each stacked plate rests flush against the rear of the array mask or rear of a guide mask if one is used. The grooves provide a guide for the fibers to slide in as the fibers are being inserted into the wafer. Fibers can be tool inserted as one group, such as a row of fibers, at a time. The grooves guide each group of fibers into their designated holes in the wafer mask. The covered grooves in the guide plates also keep the fibers perpendicular to the wafer front surface, and they provide protection to the stripped fibers as described below. The guide plates also minimize the amount of epoxy needed in the assembly, which creates a low stress termination for the fibers in the mask. The array assembly is designed to be used with any type of optical fiber provided the fiber geometry can fit within the specified hole center-to-center spacing. The guide plate is also designed with two alignment holes on the back of the plate that mate up with the alignment pins on the assembling or fiber insertion tooling.

One exemplary embodiment of insertion tooling is designed to hold at least one row or column of optical fibers at a time. The fiber tips in the tooling are held at the same center-to-center spacing as the grooves in the guide plates. The insertion tool is made up of four parts, a grooved guide section and a grooved insertion section that make up the main part of the tool and two lids or tool covers that keep fibers in these sections. The front guide section of the tool is movable to and away from the back insertion section of the tool. The back section of the tool holds tight to each fiber jacket allowing the fiber to be positioned to a prescribed position and held there. The grooved front section of the tool can slide longitudinally along the fibers that are held by the back section of the tool. The fiber distal end portions can be etched and shaped while held in the tool. After the fibers are etched the front section is moved forward covering and protecting the tips of the fibers. An injection needle or other applicator can be used to apply liquid epoxy to the rear of the guide plate channels in the row desired for insertion. The tool is then mated to the respective guide plate while the fiber tips remain covered. The front section mates with one guide plate row of channels defined by the mated guide plate. When the tool is in place, the back insertion section is moved forward toward the front section. In response, the fibers are moved out of the front section into the guide plate channels and are wetted by the liquid epoxy therein. The fibers continue to advance along the channels until the fibers bottom on the mask holes with the fiber tips extending through the respective mask holes and the conical fiber tip surfaces engaging or bottoming on the hole walls or edges. The operator or system checks to assure that all fiber tips in the row penetrate through and bottom in the mask holes. Thereafter, the tool lids are removed from the tool. This releases the fibers from the tool. The tool can then be lifted off of and away from the fibers.

The tool is subsequently loaded with another row or column of fibers. This process is repeated until all of the guide plates are loaded with fibers and all fiber tips extend through all of the openings. The stacked guide plates enhance the securement of all fibers and greatly add to the strength and integrity of the assembly.

After cure, it is preferred to bond the housing aft sidewalls and cover in place and apply a layer of epoxy to cover the mask front surface and protruding fiber tips. Next, it is preferable to position the housing vertically with the forward mask downward and liberally apply (pour) silicone, epoxy or other suitable material into the housing chamber through the open aft housing end. This liquid bonding material will tend to fill empty spaces around the mask, cladded fiber cores, guide plates, and other elements and fiber parts including the jacketed fiber portions within the housing. Once cured, the assembly has great strength, needs no further strain relief device for reliability, and prevents moisture accumulation within the housing.

It is then preferable to grind and/or polish the epoxy, cladded core tips, and the forward mask to produce a precise planar matrix surface with fiber cores diameter flush against this planar forward mask face surface. If desired, the housing aft end can be fitted with a further strain relief, bundling, or protective device to cooperate with the exposed, jacketed fibers exiting the housing.

In an alternate embodiment, the mask and guide plates are mounted to and within a mounting block and the mounting block assembly inserted longitudinally into the body chamber.

DRAWINGS

Other features, objects, and benefits shall become apparent with the following detailed description of the exemplary embodiments and exemplary assembly method according to the principles of the present invention when taken in view of the appended drawings, in which.

Figure 6:
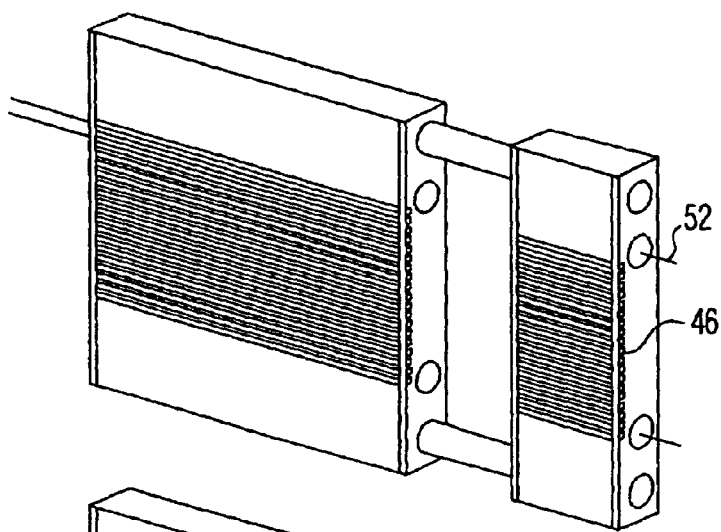
FIG. 6 is similar to FIG. 5 with the guide section in its forward position.
Figure 7:
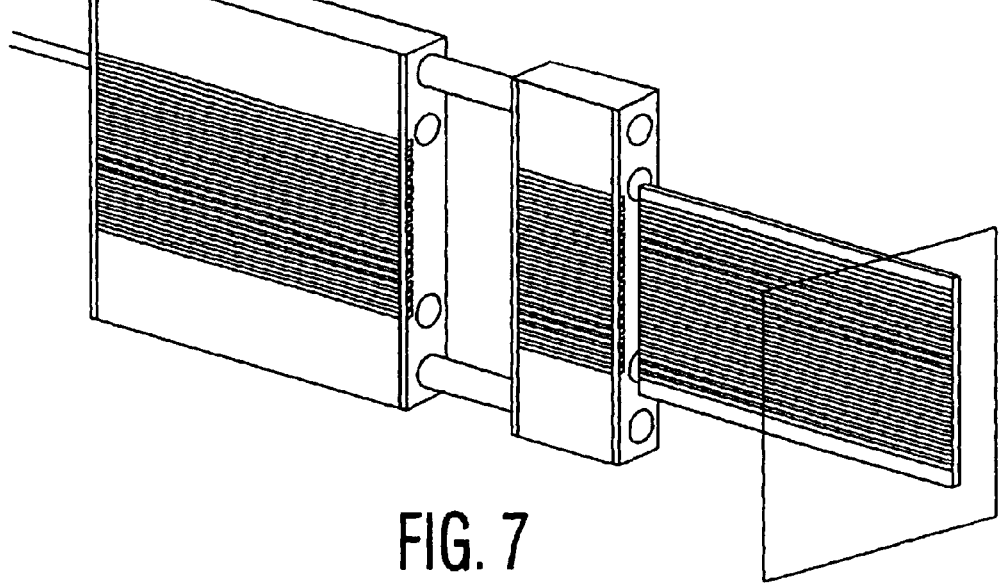

FIG. 7 is similar to FIG. 6 with the tool mated with a guide plate. The assembly in which the guide plate is mounted is not shown. The mask 10 section is shown in dashed lines.

Figure 8:
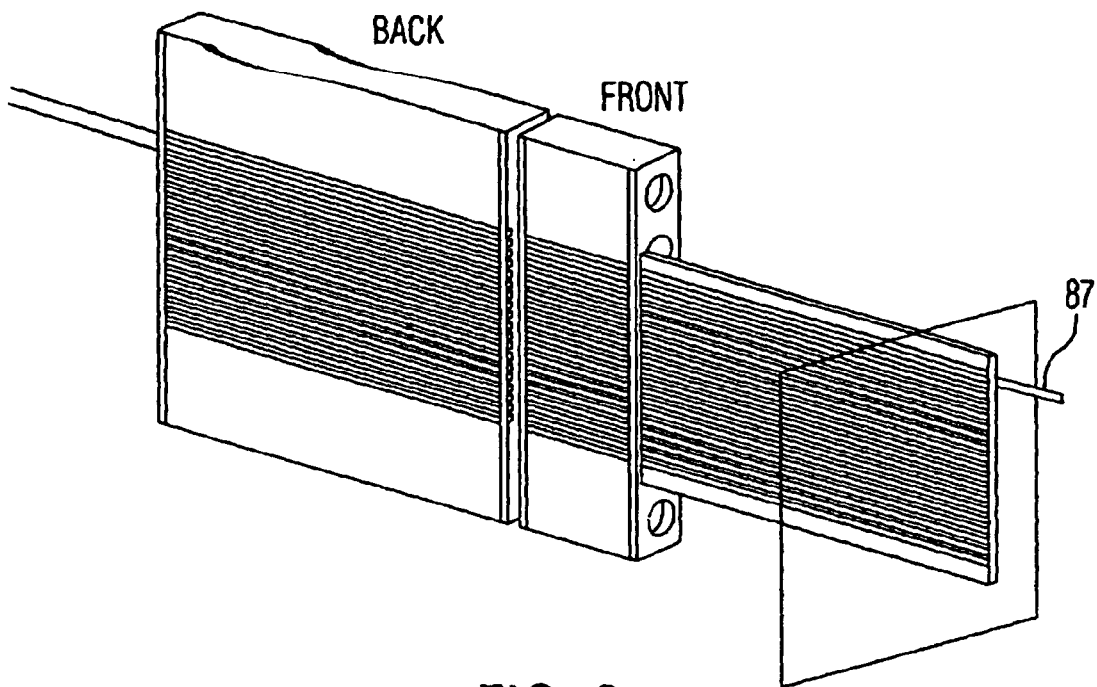

FIG. 8 is similar to FIG. 7 with the tool insertion section advanced forward to load the guide plate channels and set the stripped and shaped fiber tip in the mask holes. Only one of the full row/column of fibers is shown.

Figure 9:
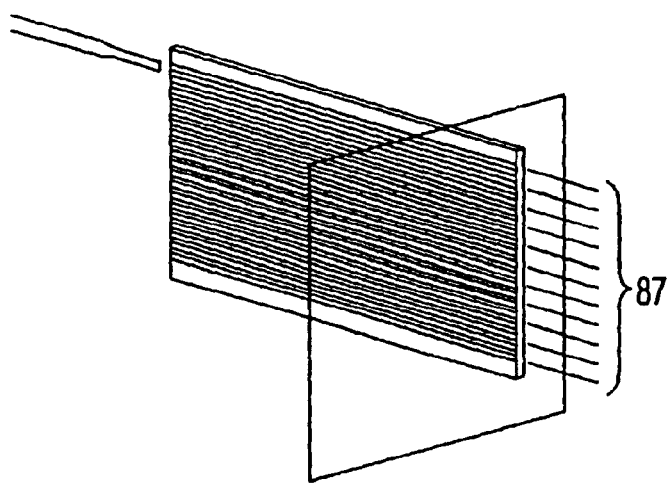

FIG. 9 is similar to FIG. 8 with the tool (not shown) removed from the fibers.

Figure 10:
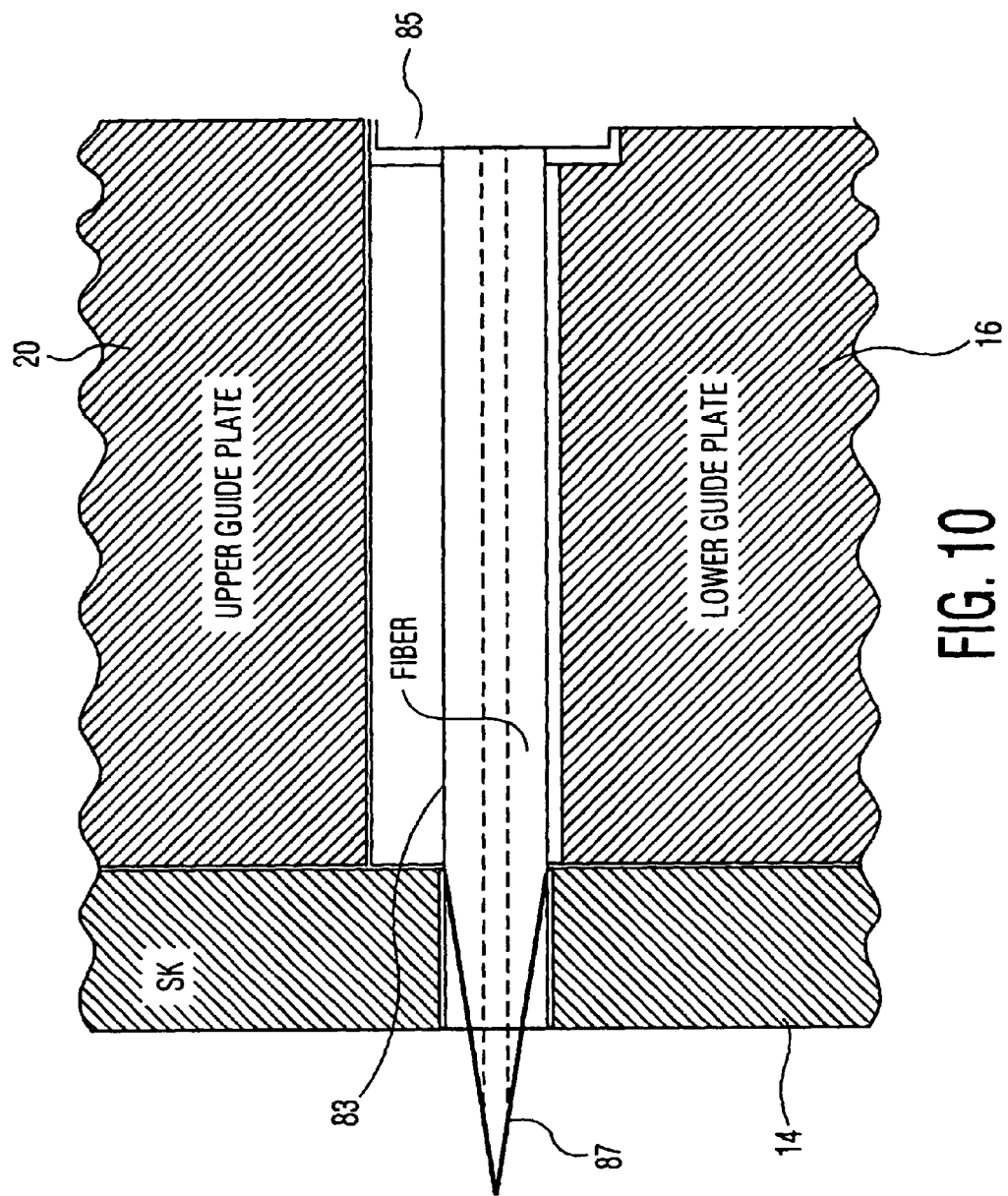

FIG. 10 is a partial side section of a fiber end seated within a guide channel with the fiber tip bottomed on and extending through the mask opening.

Figure 11:
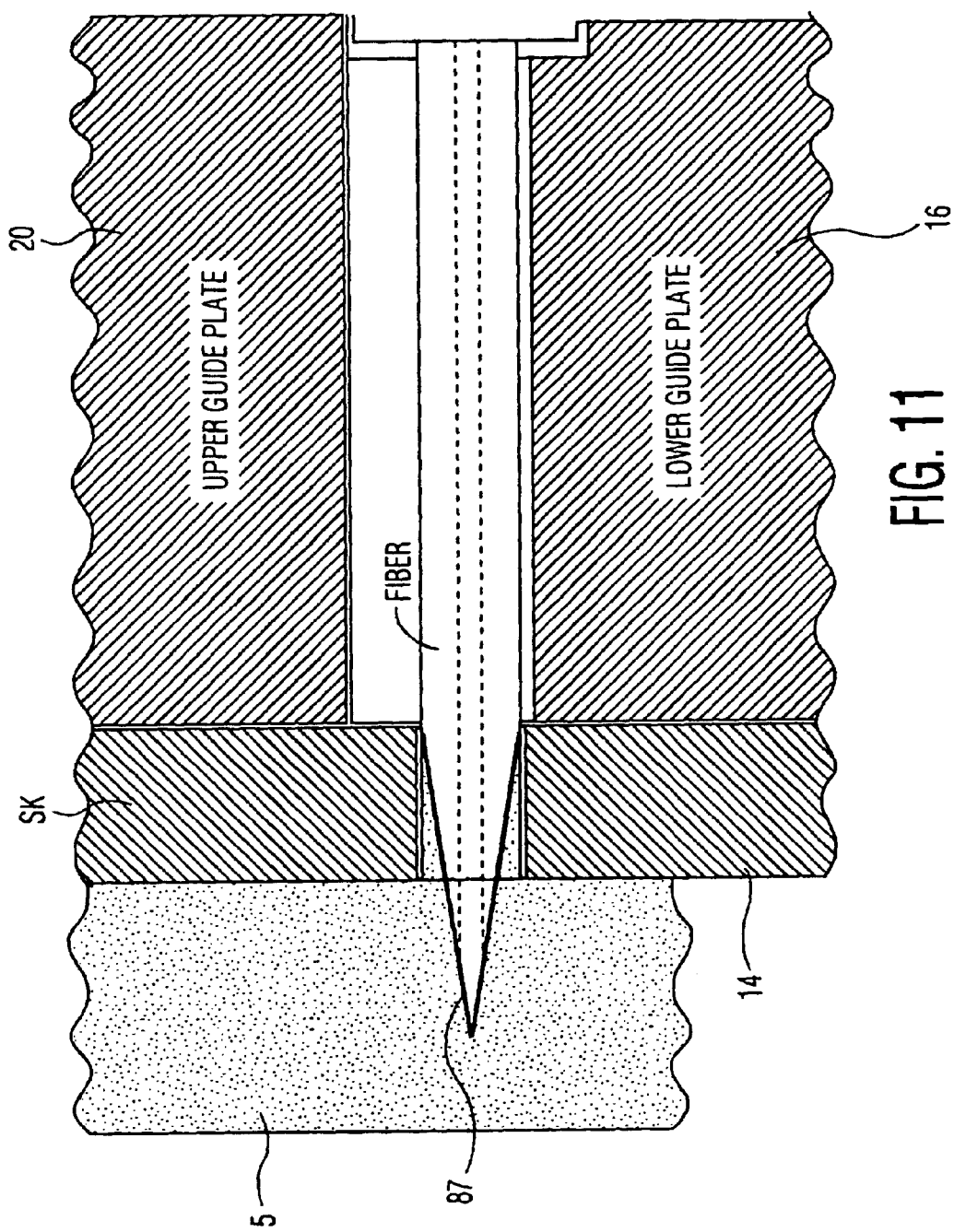

FIG. 11 is similar to FIG. 10 with a layer of epoxy covering the fiber tip and forward mask face.

Figure 12:
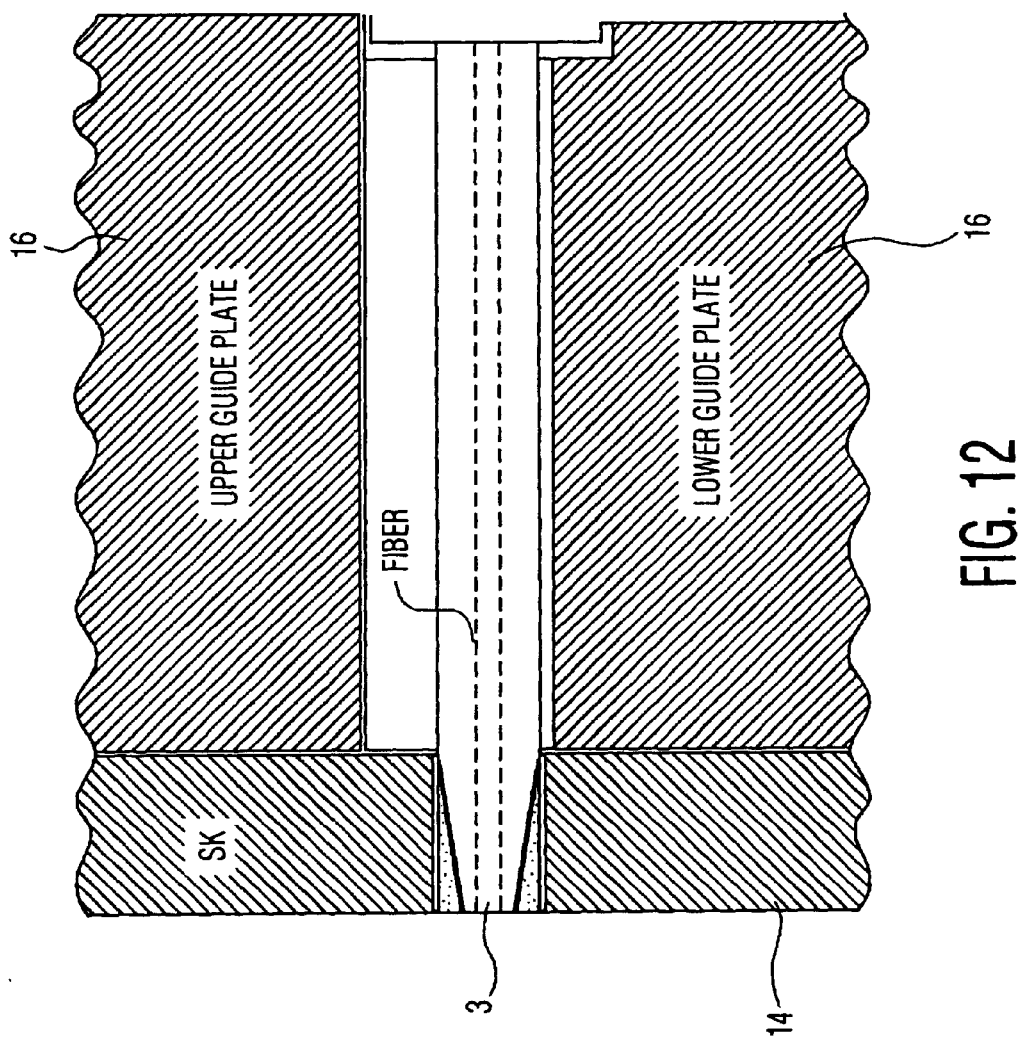

FIG. 12 is similar to FIG. 11 with the forward epoxy and embedded fiber tips ground and polished to the mask forward surface. Preferably the forward mask face is slightly ground and/or polished also.

Figure 13:
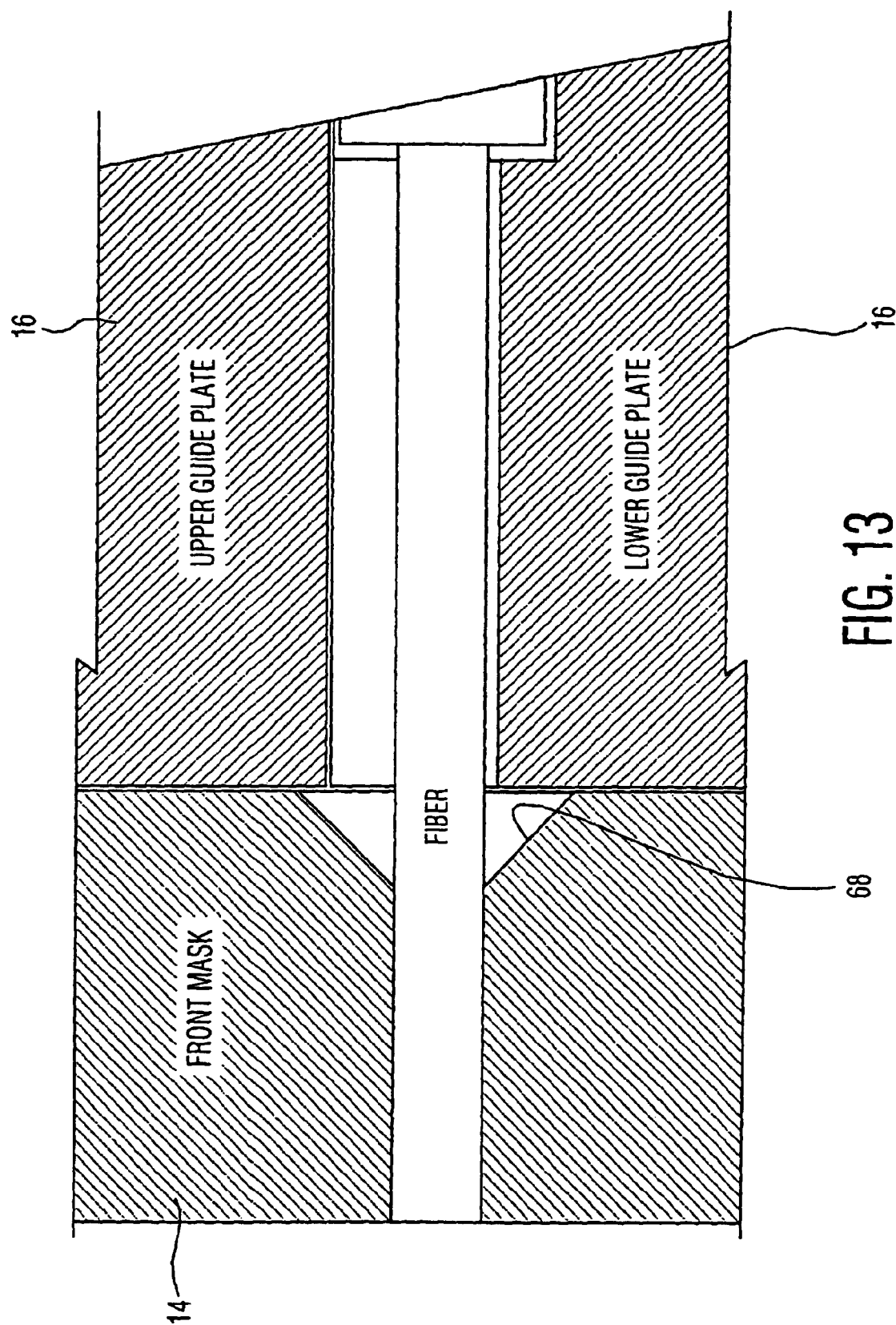

FIG. 13 is similar to FIG. 12 showing yet another alternate mask hole design.

Figure 14:
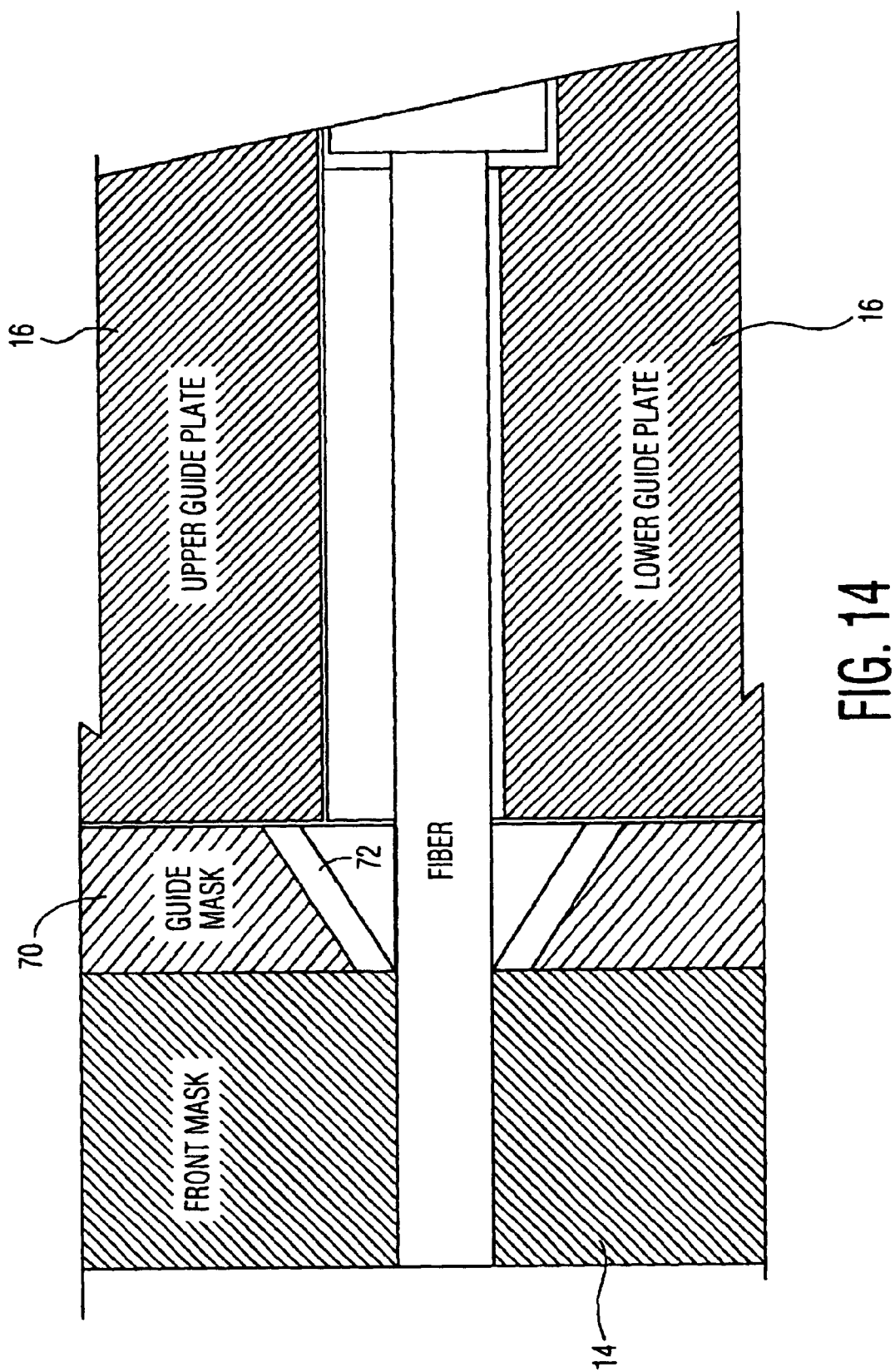

FIG. 14 is similar to FIG. 13 showing another embodiment with a guide mask between the guide plates and mask.

Figure 15:
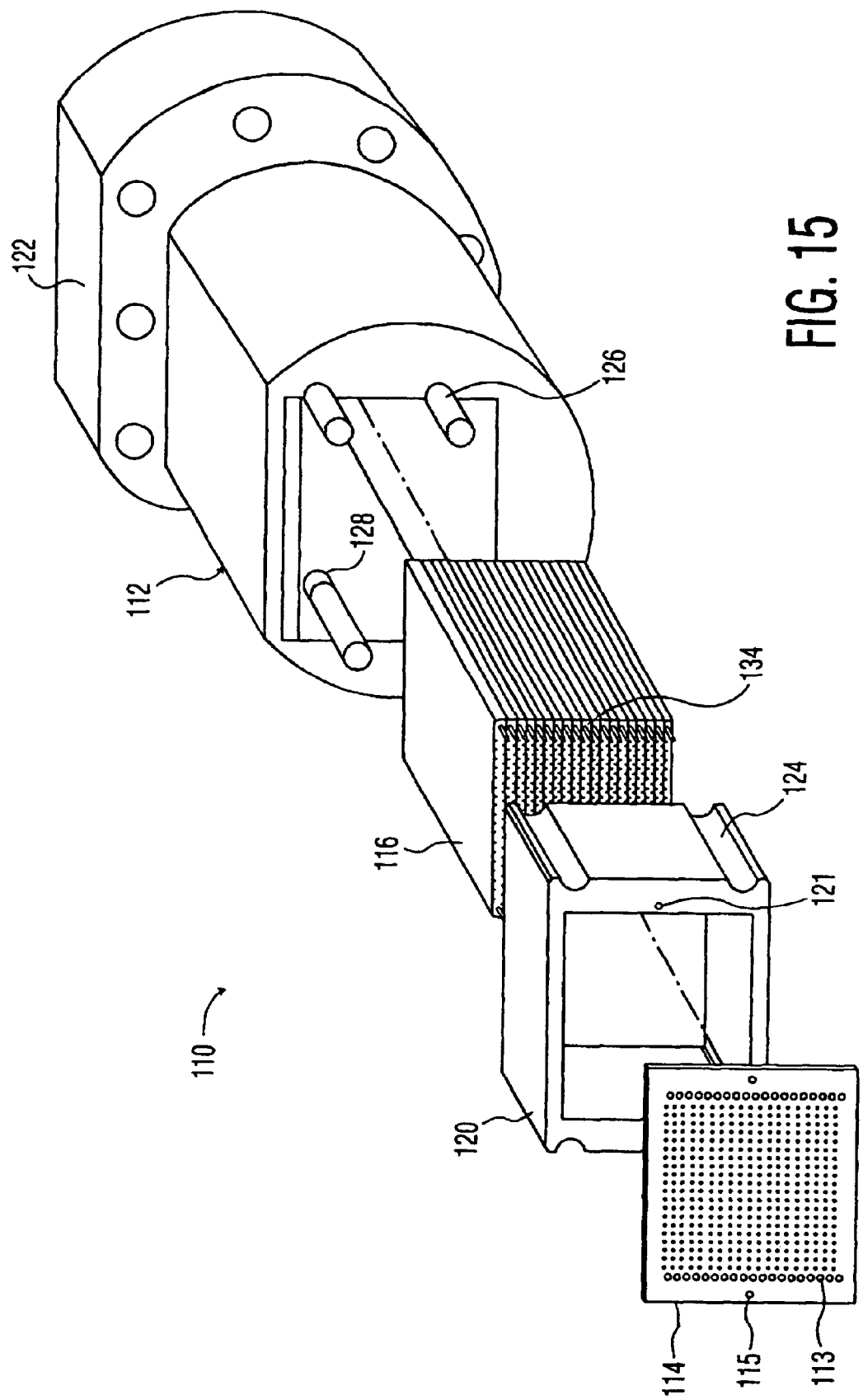

FIG. 15 is an exploded perspective view of alternate embodiment of the array assembly without the fibers or epoxy shown.

Figure 16A:
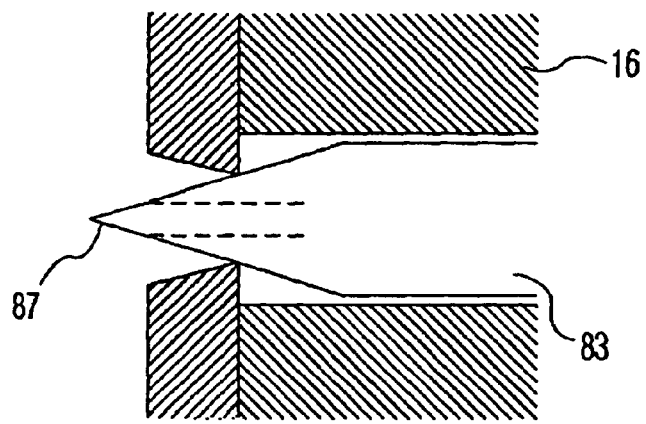

FIG. 16A is similar to FIG. 12 showing an alternate design of front mask opening.

Figure 16B:
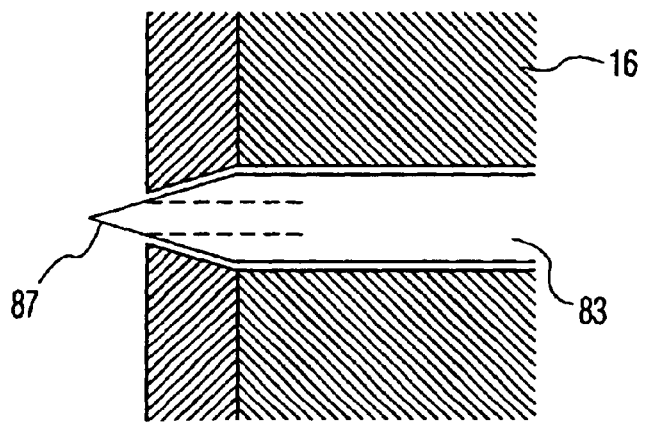

FIG. 16B is similar to FIG. 12 showing an alternate design of front mask opening.

Figure 16C:
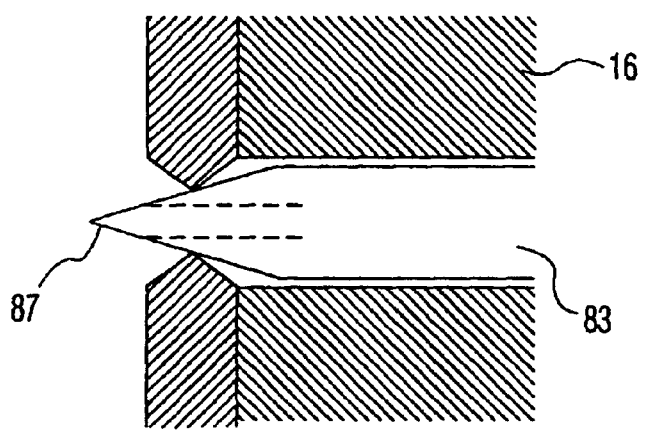

FIG. 16C is similar to FIG. 12 showing an alternate design of front mask opening.

Figure 17:
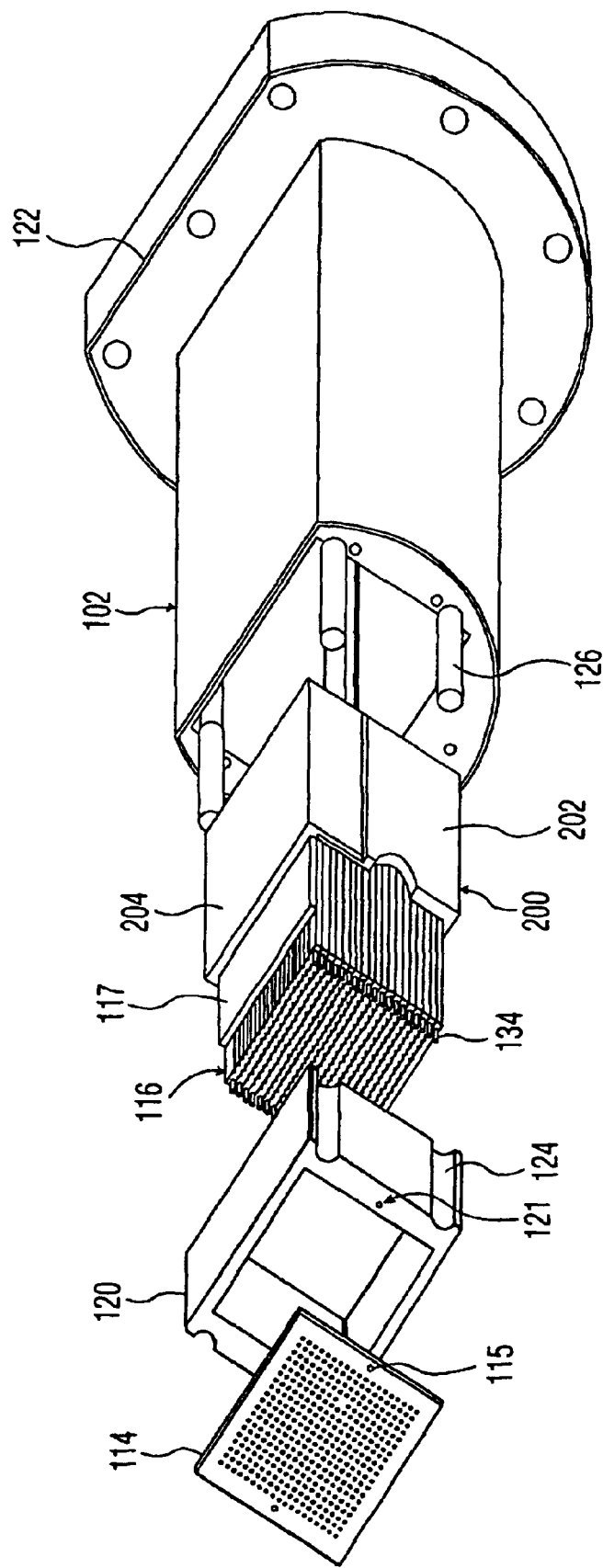

FIG. 17 is similar to FIG. 15 showing an alternate embodiment of the array.

Figure 18:
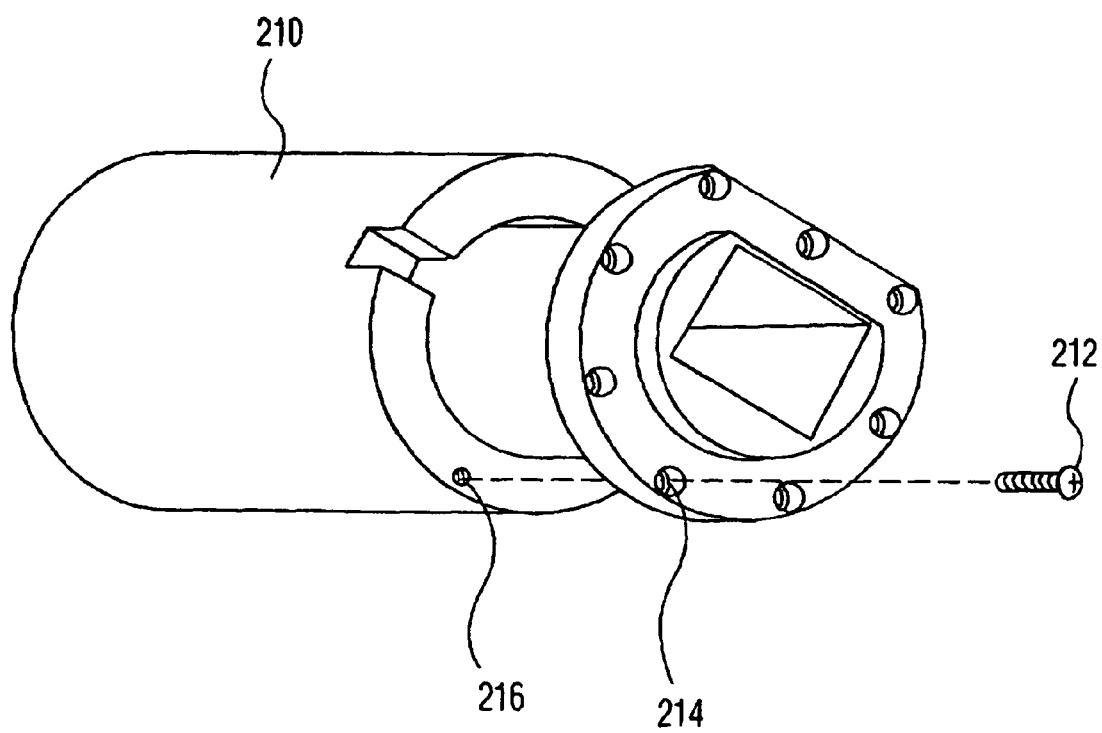

FIG. 18 is a rear view perspective of the assembly housing of FIG. 17 with the forward end partially inserted into one example of a protective shroud.

Figure 19:
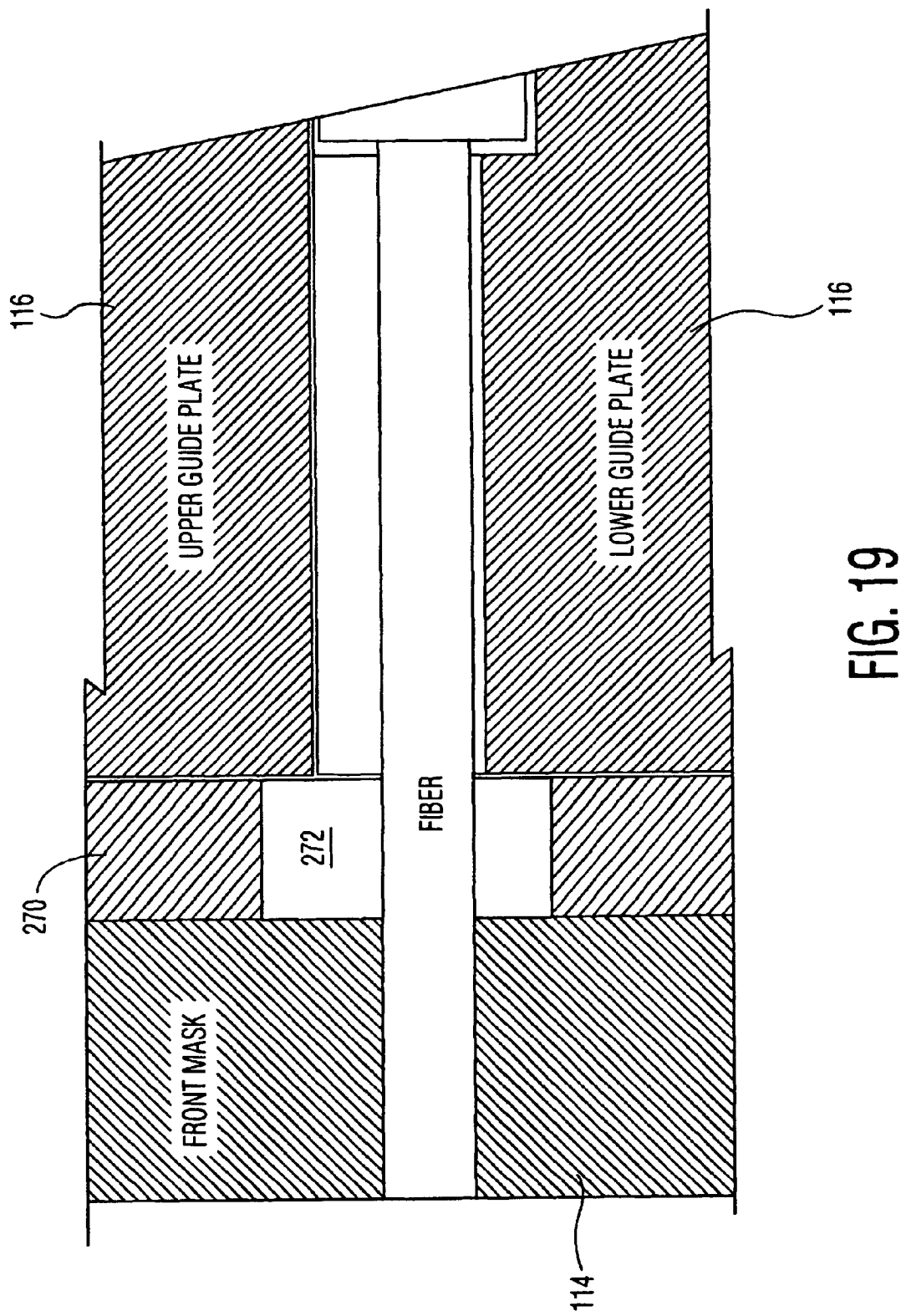

FIG. 19 is similar to FIG. 14 showing a further alternate embodiment of the invention.

Figure 20:
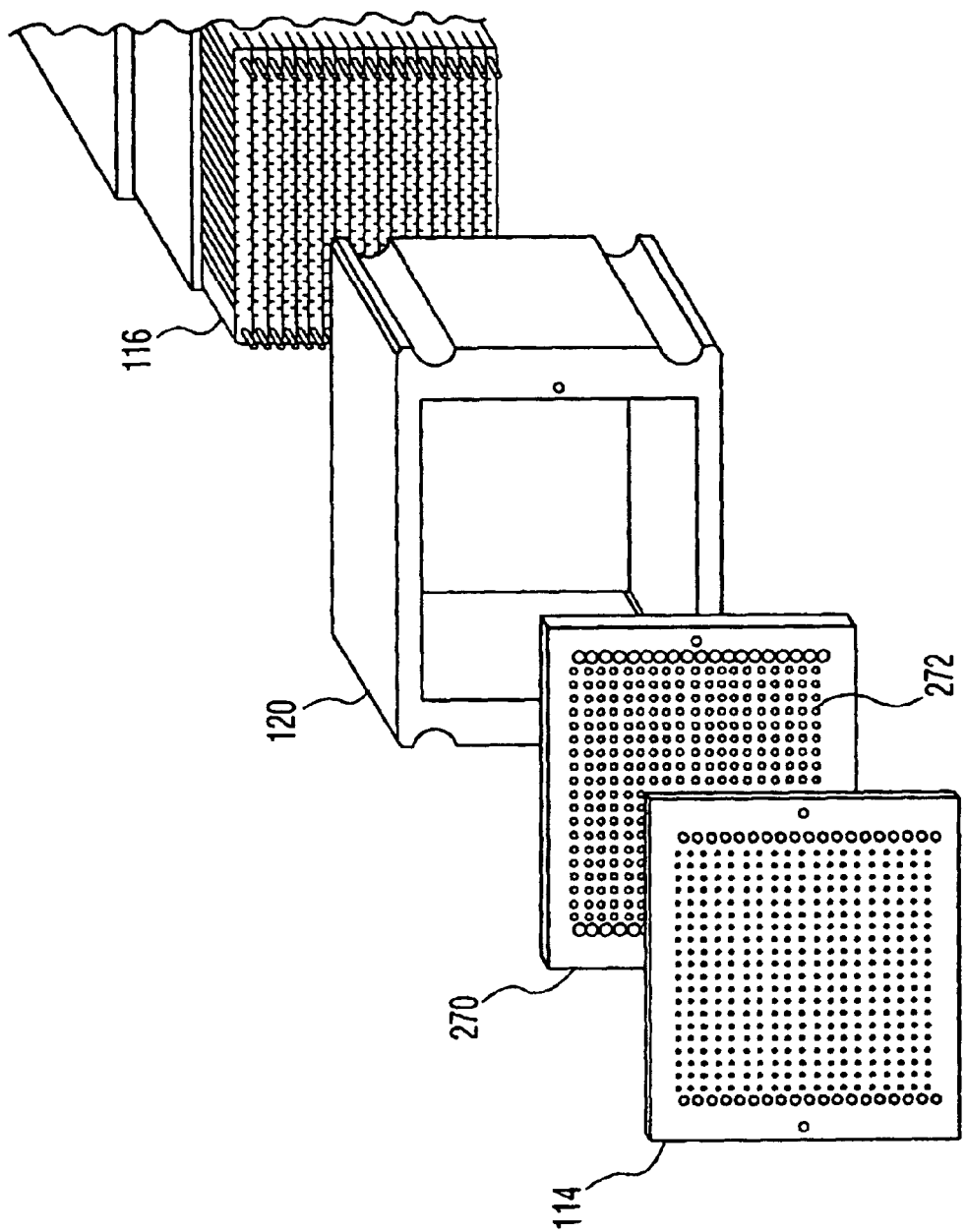

FIG. 20 is a partial exploded perspective view of the embodiment of FIG. 19.

DETAILED DESCRIPTION OF EXEMPLARY EMBODIMENT

One exemplary optical array assembly embodiment 10 according to the principles of the present invention is shown in FIGS. 1–8. In this example, the array includes a 19 by 19 matrix array, although the inventive principals hereof can be applied to arrays of fewer and more fiber rows and columns in the array. Array assembly 10 includes an elongated open top housing 2 having a body 12 having a forward end mounting mask 14 at which the coupling fiber core ends will be secured. Housing 2 can be made of stainless steel or other suitable material and can include a U-shaped aft end and a cover 26 defining the partially closed housing chamber. These parts are glued or otherwise sealed to body 12 after fiber insertion is completed, as described below. Housing 2 has an open aft end that can accommodate transition of jacketed portions of the elongated fibers. Mask 14 made of silicon or other suitable material mounts securely to the forward face of body 12. If desired, mounting pins on the guide plates described below and holes 13 at the edges of mask 14 can be provided to assure precise fit and positioning for these parts. Mask 14 is preferably made of thin, e.g. 400–600 microns, silicon material and the holes can be etched using photo-etch techniques common in the semiconductor industry to form extremely small diameter and accurately placed openings in mask 14. Although not essential, it is preferred that these openings be arranged in equal number of rows and columns, such as 19×19 or 40×40, or greater. The hole defining walls of the mask can be cylindrical generally as shown in FIG. 10 with a single diameters, or with a larger diameter at the rear surface than the forward surface, or the rear portion of the hole can be flared outward or conical to facilitate insertion of the fiber tip during installation. FIGS. 13 and 16 show a further number of suitable alternate mask hole shapes.

Figure 3A:
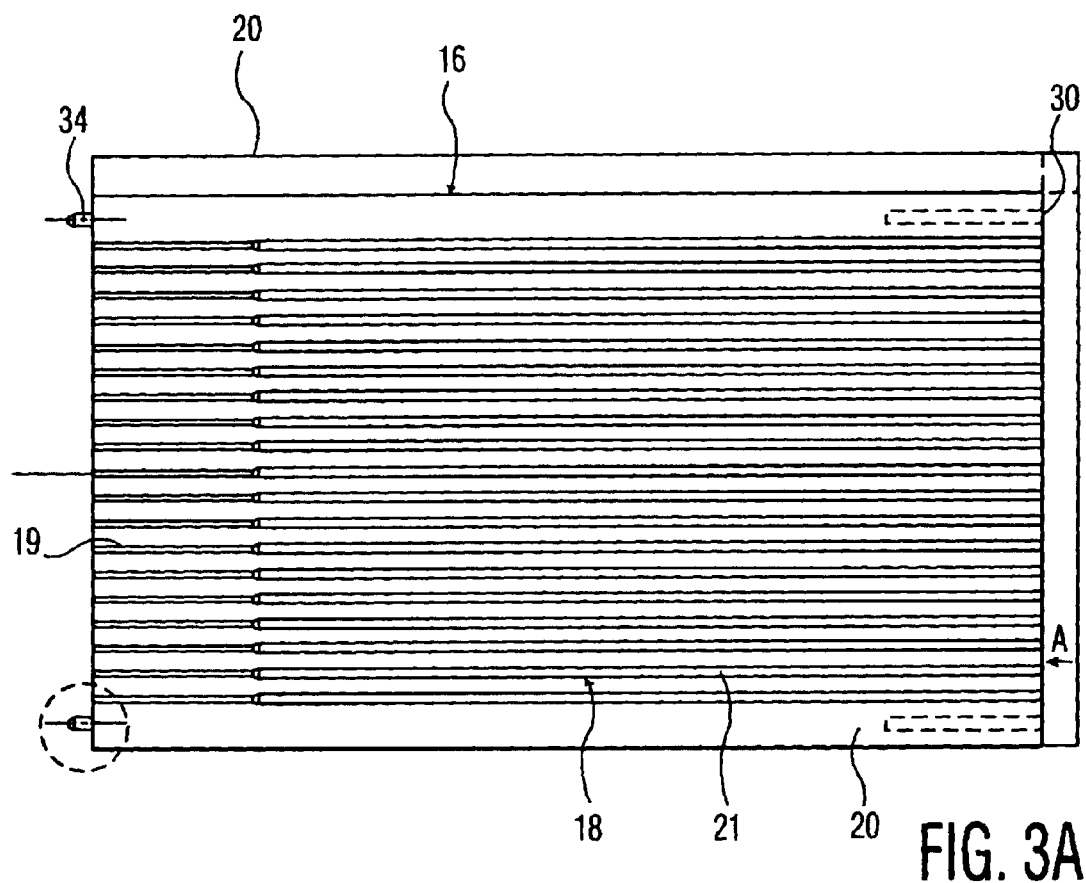
FIG. 3A is a top plan view of an exemplary guide plate.

Also part of assembly 10 are a series of guide plates 16 better seen in FIGS. 3A and B. Each guide plate 16 includes a series of guide channels 18. Channels 18 are equal in number to and align with one row or column of mask 14 openings. Thus for a 19 by 19 array, each guide plate 16 would have 19 guide channels 18 spaced to align with the openings of a row or column of openings in mask 14. In the embodiment shown, the guide plates are horizontally oriented and vertically stacked so that each guide plate channel set aligns with one row of mask openings. Each channel 18 can include a narrow forward section 19 to direct and house the cladded core portion of a fiber and a wider rear section 21 to direct and house the buffer layer of the fiber, if one is used. In any event, channel 18 is dimensioned to accommodate the fiber dimensions to a point short of the jacket. The stipped portions 3 and 5 of the fibers should be guided by but free to translate through the respective guide channel portions. As better seen in FIG. 10, the bottom or lower portion 20 of an upper guide plate closes the channels 18 of its adjacent or lower guide plate.

Figure 1:
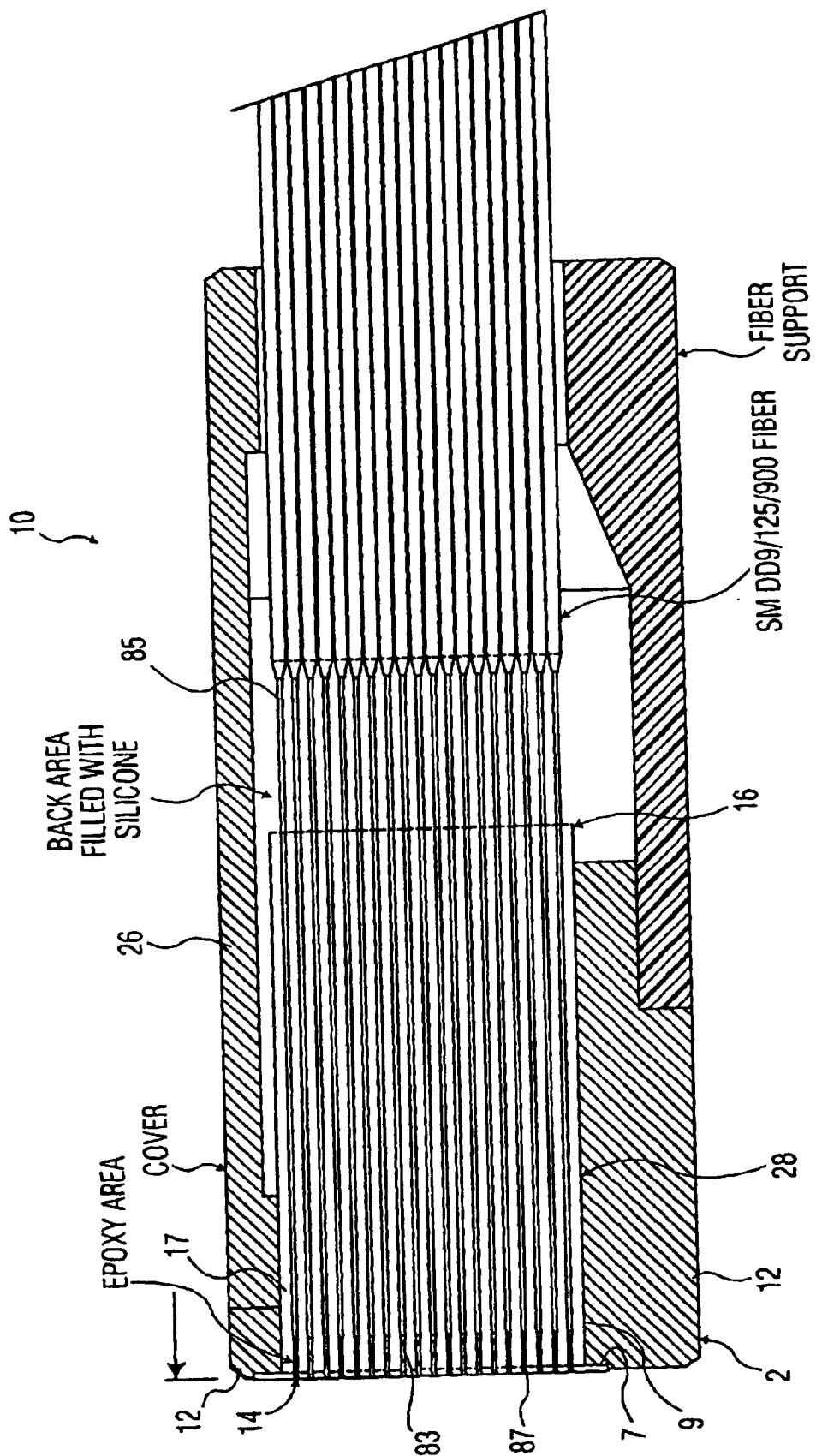
FIG. 1 is a side section taken along line 1—1 of FIG. 2 of a completed exemplary embodiment of the array assembly according to the principle of the present invention. However, the epoxy that fills internal voids is not shown for clarity of depiction of other parts.
Figure 2:
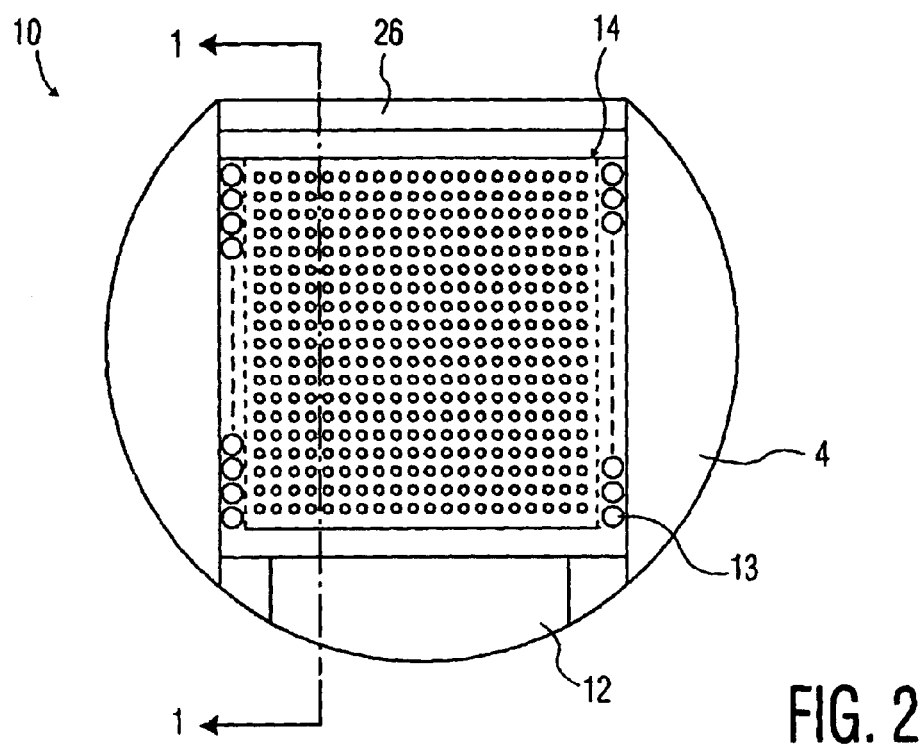
FIG. 2 is a front view of the assembly of FIG. 1.

Referencing FIG. 1, the series of guide plates 16 are horizontally oriented and closely stack on one another, each with its channels 18 aligned with a row of mask openings. This assembly forms during and after fiber insertion a precisely aligned guide and protection system for the fibers. Plates 16 substantially abut the rear face of mask 14 to enhance opening alignment and provide structured support to mask 14 thereby enabling grinding and polishing on the front mask face as described below. Housing 2 is at least partially closed by body 12, aft end 4, and cover 26 that can be bonded or otherwise sealed to each other. As, further described below, suitable bonding material can be placed to fill the voids within the chamber. This bonding material is not shown in FIG. 1 for clear depiction of other parts. Once cured this bonded assembly may require no further strain relief device and yields a solid, rugged assembly.

Initially, fiber tips extend beyond the forward face of mask 14. Epoxy should be applied to cover the tips and then the epoxy layer, embedded tips, and front mask surface can be ground and polished to the mask 14 forward surface thus exposing the full core diameters at precise locations on the mask surface.

Example Tool

One exemplary assembly method will now be described. This exemplary method uses a fiber guide insertion tool 40 conceptually shown in FIG. 4 that includes forward guide section 42 and rear insertion section 44 that can translate fore and aft of each other on tool guide rails or pins 50 secured to one of sections 42, 44 and riding in mating holes of the other. Section 42 includes at least two alignment pins 52 that insert into openings 30 of plate 16. See FIG. 3A. Sections 42, 44 include channels 46, 48 that in total can accommodate, when sections 42, 44 are together, the length of fibers that will remain in housing 2 after installation.

Fiber Preparation

The fibers must be prepared prior to installation to remove distal jacket and buffer layers from portion 83 and, preferably shape the conical fiber tips 87. Tool 40 is preferably used for this function. With tool 40 in its closed position, jacketed fibers are laid into aligned grooves 48 and 46 with the distal ends extending about 2 inches (for a 3" housing) beyond the forward edge of section 42. Covers 54, 56 provided with grips 58, 60, installed across surfaces 47, 49 and held by U-channels 62 and 64 to close and cover the tops of channels 46, 48. With jacketed fibers so held in these sections, the exposed fibers are placed in an acid bath to etch the jacket from these fibers portions 85 in the standard manner. The assembly is cleaned and, if the fibers include a buffer layer, the one-quarter to one-half inch fiber ends 83 are placed into a bath of acid to remove the buffer layer. Alternatively, fiber buffer and/or jacket layers can be removed by mechanical or other thermo-mechanical means. The assembly is cleaned again and the tips 87 of the cladded core portions are placed in a bath of acid and slowly withdrawn to etch these tips into a full or truncated conical shape. After cleaning, the fibers themselves are ready for insertion. Next, the section 42 is drawn away from section 44 until the fiber tips are positioned rearward of the forward edges of channels 46 and lie protected under cover 54.

Plate Assembly

Figure 3B:
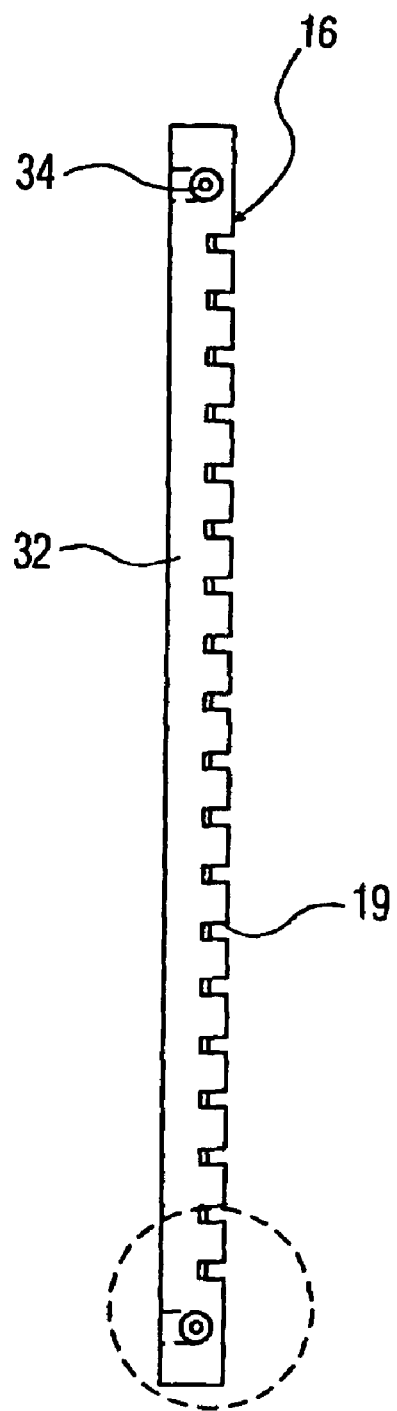
FIG. 3B is a front view of the guide plate of FIG. 3A.
Figure 4:
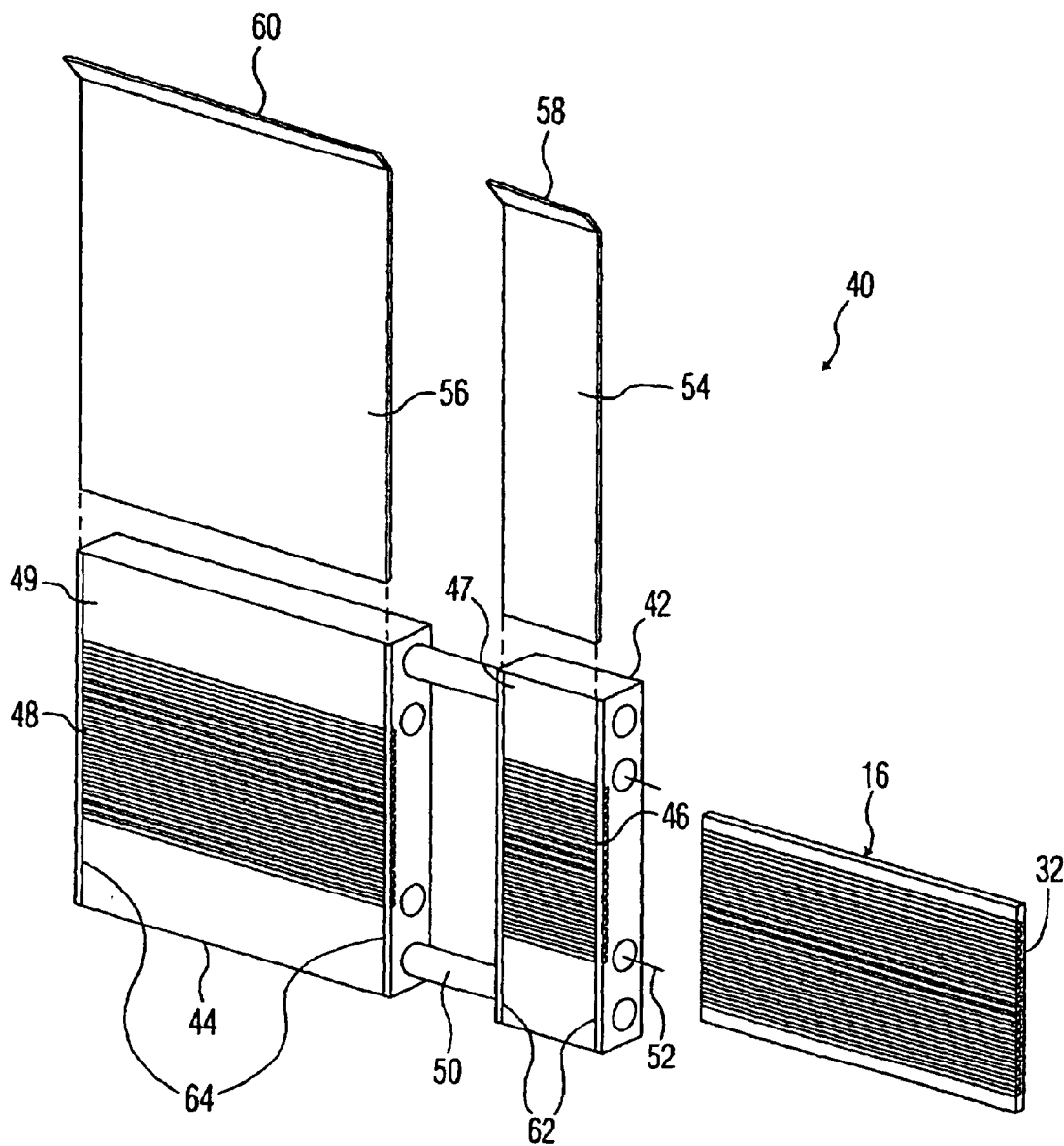
FIG. 4 is a perspective exploded view of one example of a fiber insertion tool and one guide plate without the fibers shown.
Figure 5:
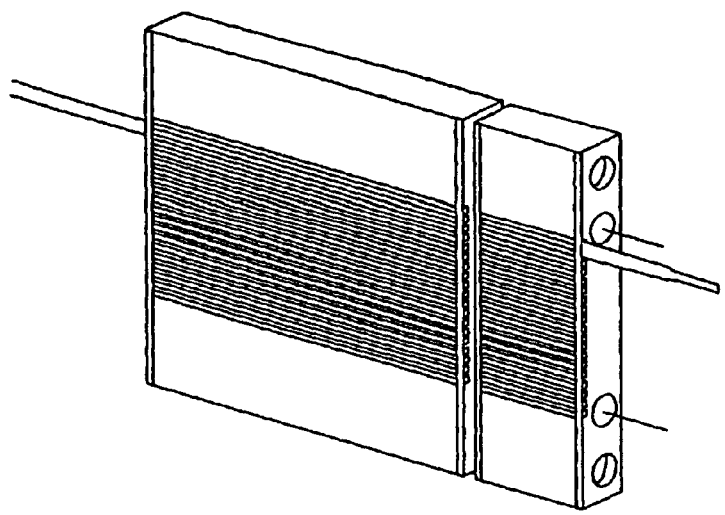
FIG. 5 is a perspective view of the tool without the covers and only one fiber shown.

Either before or after the above steps, empty guide plate No. 1, for fiber row No. 1, is placed on the floor or mounting platform 9 of body 12, see FIGS. 1, 3A and 3B with its forward face 32 aligned with the mask edge seating surface 7. With plate No. 1 held or clamped in place, bonding material is applied to surface 7 and mask 14 seated with pins 34 inserted through the bottom two alignment holes 13, i.e. mask row 1 alignment holes. With mask 14 firmly bonded as shown in FIG. 1, the clamp (not shown) is removed and guide plates 2–19 are installed generally as shown with their forward faces 32 substantially flush against the rear face of mask 14 and their alignment pins 34 seated in respective holes 13 of mask 14. Upper plate 17 serves to cover the top most channels of the top most guide plate. The sides of plates 16 should fit precisely within the internal side wall guides of body 12. Thus, the vertical and lateral positioning of stacked plates 16 assure longitudinal alignment between each opening in mask 14 and each respective channel portion 19 of plates 16. The plate 16 assembly is ready for fiber insertion. It should be understood that aft portion 4 and cover 26 are not assembled or present at this time.

Fiber Insertion

The present method example inserts one row of 19 fibers at a time beginning with row 1 and ending with row 19. However, the method according to the principles of the present invention is not so limited. Single or multiple row or column insertion is well within the principles of the present invention as well as configurations of mask hole geometries other than rows and columns. Reference is made to FIGS. 5–9 with the understanding covers 54 and 56 are not shown. The insertion tool is placed in the position shown in FIG. 6 and tips withdrawn under cover 54. Liquid epoxy is applied to the aft parts of plate 16 channels 21. A small ejection needle or applicator can be used for this purpose. Tool 40 is next acquired with jacketed fiber portions extending rearward of the tool section 44 and body 12. Tool 40 is moved forward to insert pins 52 into holes 30 of the row No. 1 guide plate. See FIG. 7. When fully seated, insertion section 44 is advanced toward section 42 to move all jacket portions forward which, in turn, advances the buffered layer 85, cladded layer 83 and tips 87 through the covered channels 18 of plate No. 1. As the tips move through channels 21, they are wetted by the epoxy placed in the channels as mentioned above. As the fiber tips 87 reach channel portions 19, their lateral and vertical movements are further restricted by the small cross section of this portion 19. As tips 87 reach the row No. 1 mask holes, the conical surface engages or bottoms on the side walls of the respective mask opening. The extreme tips 87 portion of each fiber had exited the forward mask face generally as shown in FIG. 10 with the full core diameter extending beyond the mask forward surface. Covers 58, 60 can then be removed to release the tool from the inserted row No. 1 of fibers. Tool sections 42, 44 can then be removed leaving the row 1 fibers generally as shown in FIG. 1. The epoxy on the wetted, conical tips 87 will subsequently be cured preferably under heat lamps at 60° C. to hold the fiber tips within the mask holes.

Tool 40 is prepared for loading of jacketed fibers for row No. 2. The row No. 2 fibers are prepared and the process repeated for row No. 2 fiber insertion. The process as described is repeated for row nos. 3–19.

When all 19×19 fibers have been inserted, the cover 26 and aft portion 4 are bonded to body 12 and each other to complete the housing 2 enclosure except for the open back side. After the body, cover, and aft portion bonding material sets or cures, a layer 5 of epoxy is applied to cover the mask holes and tips 87 protruding therethrough. See FIG. 11. After layer 5 cures, housing 2 is turned upstanding with mask 14 facing downward. At this stage, it is preferred to pour liquid epoxy or silicone down onto the stacked guide plates 16 to fill voids and spaces within the housing all the way up to the opening in the housing back end and around the jacketed fiber portions. The bonding material prevents moisture accumulation or migration within the body and provides securement and strength to the overall assembly. No further strain relief need be added to the assembly although, if desired, further strain relief, bundling, or cowling devices can be attached to the housing body and/or the jacketed fibers rearward of housing 12.

Once the internal body bonding material cures or sets, the epoxy layer 5, the tips 87 within it and the forward surface of mask 14 can be ground and polished to yield a 19×19 matrix array of precisely located and polished fiber cores 3 (FIG. 12) surrounded by some cladding 1 at the plane of the forward mask 14 surface. The final assembly provides an accurate, rugged, high fiber count array with jacketed fibers extending from the rear of housing 2.

Alternate Embodiments

With reference to FIG. 13, an alternate mask opening is shown having a flared or conical portion 68 at the rear face of mask 14 that functions to guide the advancing fiber tip into the opening. This arrangement allows for less of a conical angle at the fiber tip while retaining the certainty of fiber tip positioning and translation.

Another alternate mask opening is shown in FIG. 14 in which an intermediate guide mask 70 includes a conical or pyramidal opening 72 flared rearward to guide the fiber tip into the respective mask 14 opening. Further alternate mask opening shapes are shown in FIG. 16. Mask 70 is preferably made of silicon with etched openings for precision. Forward edges of plates 16 substantially abut mask 70 to provide structural support to the guide and front masks.

An alternate array assembly 110 is shown in the exploded view of FIG. 15. Mask 114 is similar to mask 14 but includes additional mounting and alignment holes 115. A mounting block 120 provides a mounting surface for mask 124 on pins 121 and a frame for stacked guide plates 116. Block 120 includes guide channels 124 that engage movable pins 126 mounted for longitudinal movement in grooves 128 of the housing 112 chamber. Pins 126 and grooves 124 assure precise insertion and alignment of block 120.

To assemble, mask 114 is mounted to the forward face of block 120 on pins 121 and glued or bonded in place. The stacked guide plates 116 are inserted from the rear of block 120 and include pins 134 that seat in alignment holes 113. The block 120 assembly can now be inserted into housing 102 chamber from the forward end by placing channels 124 on pins 126 and sliding the assembly rearward into housing 102 until the rear of pins 126 contact the rear of channels 128. The outer walls of block 120 can be applied with epoxy so that block 120 becomes bonded to the inner walls of housing 102 chamber to secure these parts. Housing 102 assembly is now ready for fiber insertion. The fiber ends are preferably prepared as described above. Liquid epoxy can be applied at the back end of each channel row of plate 116. Stripped fiber ends can be inserted manually into the back end of each such channel so that the conical tip becomes wetted while being pushed toward its respective mask opening as described above. The process is repeated until all 19×19 (or other numbered matrix) openings are installed. If desired, a tool similar to that shown in FIG. 4 can be used to insert one or more rows of fibers at a time.

The alternate embodiment of the array of FIG. 17 is similar to that of FIG. 15, common parts having common reference characters. The embodiment of FIG. 17 also includes a guide plate housing 200 preferably including a bottom section 202 and an interlocking or overlapping top section 204. The sidewalls of section 202 preferably extend substantially the full height of the stack 116 of guide plates. The upper part of the side walls can be recessed to accommodate the sidewalls of top section 204 to assure proper fit of housing 200 into the housing 102 chamber. A top plate 117 covers the top-most plate of the plate stack 116. In addition to the epoxy applied to the rear of mask 114 and forward face of block 120, epoxy should be applied to the aft ends of plates 116 and the inside sidewalls of section 202 and inside sidewall of section 204 thus securing the entire assembly as a rigid package. As generally shown in FIG. 18, a shroud or protection covering 210 can be provided about the forward portion of housing 102 and can be secured to collar 122 by one or more bolts 212 threaded into tapped hole 216 and through collar opening 214.

A further alternate embodiment is shown in FIGS. 19 and 20. This embodiment is similar to that shown in FIG. 18 but further includes a support mask 270 positioned between the front mask 114 and front face of housing 114. If desired, an additional guide mask (not shown) can be positioned between the rear face of support mask 270 and the front faces of block 120 and plates 116. Openings 272 of mask 270 maybe but need not be fiber tip guide openings since the primary function of mask 270 is to provide fore and aft structural support for the thin front mask 114. Mask 270 can be made of plastic, ceramic, metal, glass, or other suitable force resistant material and have a thickness suitable for supporting mask 114 during assembly, grinding, polishing, and other steps of the assembly process and of use of the device. Because of the supporting forces provided to mask 114 by mask 270, mask 270 allows (i) the front ends of guide plates 116 to be located further aft from their position shown in FIG. 19, and/or (ii) variation of the space(s) between guide plates 116 and the rear surface of mask 270 in response to thermal expansion and contraction of the various parts of the array.

Other and further modifications and improvements can be made to the herein disclosed exemplary embodiments without departing from the spirit and scope of the present invention. It should be understood that the drawings are not necessarily drawn to scale and that terms herein such as top, upper, forward, etc. are illustrative and not limiting.

It will be understood that the fiber array mask or wafer is sometimes in the art referred to as a fiber plate and that the optional fiber array assembly is sometimes referred to as a fiber block assembly.

It will also be understood that the front mask hereof, can also be termed a front or first plate; the rear and forward directions of the housed array may also be termed top and bottom, respectively; and the guide channels can also be termed grooves.

We claim:

1. A method of assembling an optical fiber array assembly including
    providing an array mask with a plurality of openings extending between a rear face and forward face and arranged in a predetermined hole pattern including at least three openings,
    providing at least first and second guide plates, each guide plate comprising at least three guide channels formed in one surface thereof, and closing the respective guide channels of said first guide plate by stacking the second guide plate in contact with said first guide plate,
    securing said mask and said guide plates in fixed positions relative to each other,
    before or after the above steps, exposing the cladding layers at distal forward portions of at least three fibers,
    after said closing step advancing said forward portions of said fibers simultaneously or sequentially through channels for guiding the fibers and translating them into at least three array mask openings, and
    securing said fibers in said channels and said array mask openings.

2. A method according to claim 1 further comprising
    prior to said advancing step, shaping the forward tip of each of said fibers into a conical shape and, wherein
    said advancing includes translating said forward portions such that a portion of each distal tip and core of said fibers extends from the forward face of said array mask.

3. A method according to claim 2 wherein
    said advancing stops for each fiber forward portion when its respective conical tip contacts the array mask opening wall of the respective array mask opening.

4. A method according to claim 2 further comprising
    applying adhesive material to the forward face of the array mask to cover the fiber tip portions extending forward of the array mask forward face.

5. A method according to claim 4 further comprising
    removing the adhesive material, extending tip portions and cores to provide precise fiber core surfaces aligned in the plane of the remaining array mask forward surface.

6. A method according to claim 1 further comprising
    applying liquid epoxy material to said fiber forward portions prior to or during advancing of said fiber forward portions through said channels.

7. A method according to claim 1 wherein
    said securing step, at least in part, includes wetting said fiber forward portions with liquid epoxy prior to or during advancing of said fiber forward portions through said channel set,
    and bonding the fiber forward portions to said channels and said array mask by allowing said epoxy to set.

8. A method according to claim 1 wherein
    said at least three fiber forward portions are substantially simultaneously advanced through said channels.

9. A method according to claim 8 further including
    inserting longitudinally said at least three fiber forward portions substantially simultaneously into said channels.

10. A method according to claim 9 wherein
    inserting includes releasably securing the jacketed portions of said at least three fibers together,
    providing a guide tool with at least three tool channels for guiding the forward fiber portions and aligning said tool channels with the aft portions of said guide plate at least three channels,
    applying forward translation force to the secured jacketed portions to advance said forward fiber portions through said tool channels, into said guide plate channels, until fiber tips extend through said array mask openings.

11. A method according to claim 1 wherein
    said providing at least first and second guide plates includes providing Y guide plates, each guide plate including a set of X channels, where X equals or does not equal Y, and wherein
    said array mask includes X rows of openings and Y columns of openings.

12. A method according to claim 11 wherein
    said at least three fibers is X number of fibers.

13. A method according to claim 12 wherein
    providing said Y guide plates includes stacking said Y guide plates.

14. A method according to claim 13 wherein
    providing a topmost cover plate to cover the topmost guide plate channels.

15. A method according to claim 13 wherein
    said first mentioned securing step includes securing said stacked Y guide plates in a predetermined fixed position within and relative to a mounting block and securing a support mask to the forward end of the mounting block in a second predetermined fixed position relative to the array mask to provide longitudinal support to the array mask when the front surface of the array mask is ground or polished.

16. A method according to claim 15 wherein
    said first mentioned securing step further includes securing a guide plate housing about said stack of Y guide plates and securing said guide plate housing within said mounting block at a predetermined position.

17. A method according to claim 16 wherein
    said method further comprising providing an assembly housing defining a longitudinal chamber,
    securing the mounting block within the housing walls defining the chamber such that said forward face of said array mask is substantially at the forward end of the chamber for alignment with a mating array of optical fiber ends.

18. A method according to claim 13 wherein
    said first mentioned securing step includes securing said stacked Y guide plates in a predetermined fixed position within and relative to an assembly housing and securing to the forward end of the assembly housing in a second predetermined fixed position relative to the array mask.

19. A method according to claim 18 wherein said assembly housing defines a longitudinal chamber, securing said stacked Y guide plates within the assembly housing walls defining the chamber such that said forward face of said array mask is substantially at the forward end of the chamber for alignment with a mating array of optical fiber ends.

20. A method according to claim 1 wherein said array mask comprises etchable material and said method further comprising etching said X and Y openings in said array mask.

21. A method according to claim 1 wherein said first mentioned guiding said fibers includes guiding the distal forward portion of each fiber directly from the respective guide plate channel into the respective array mask opening.

22. A method according to claim 1 wherein said first mentioned guiding said fibers includes guiding the distal forward portion of each fiber from the respective guide plate channel into and through a guide mask opening then into the respective array mask opening.

23. An optical connector including an optical array assembly, said assembly comprising:

a mask made of etchable material and defining a plurality of etched mask openings arranged in a predetermined pattern, a channel device comprising a plurality of elongated channels for guiding a plurality of fiber tips into said mask openings when they are advanced longitudinally forward within said channels, each of said channels including a forward portion having cross section greater than the cladding cross section but less than the fiber buffer layer cross section defined by the buffer layer diameter, a housing apparatus for mounting said mask and said device in fixed positions relative to each other, said housing apparatus having an opening through which fibers within the housing can extend outside the housing apparatus, said mask, channel device, and housing being initially at least three separate parts, and wherein said mask is made of material different from that of the channel device and housing, a plurality of fibers each having a stripped forward cladded core end located within said forward channel portion and having a distal tip portion forward of said forward channel portion and extending through a mask opening and, bonding material, within said housing apparatus, secured to the channel device, fiber portions, and housing apparatus.

24. An optical fiber array comprising, a housing, a front mask coupled to said housing and having a plurality of spaced front mask openings, a plurality of guide plates secured at least partially within and to said housing, each guide plate having a set of guide channels aligned with a set of front mask openings, a set of optical fibers extending along each corresponding set of guide channels and having distal ends extending through a respective set of front mask openings, bonding means securing said fibers distal ends to said mask openings, and each of said guide plates contacting at least one other guide plate to close the guide channels of such other guide plate.

25. An optical fiber array according to claim 24 further comprising a mounting block having a forward surface, said guide plates having forward ends positioned within the transverse profile of said mounting block, said front mask being secured substantially adjacent said mounting block forward surface, and said mounting block being secured within said housing.

26. An optical fiber array according to claim 25 further comprising a fiber guide mask for guiding the distal end of each fiber toward a respective opening in the front mask when the fiber translates in the respective guide plate channel, said guide mask being secured between said front mask and said mounting block front surface.

27. An optical fiber array according to claim 26 wherein said guide mask engages one of said front mask and said mounting block front surface.

28. An optical fiber array according to claim 27 wherein said guide plates have front surfaces substantially aligned with each other in the transverse direction and said guide plate front surfaces are secured substantially adjacent the rear surface of said guide mask.

29. An optical fiber array according to claim 25 wherein at least two guide plates comprise forward facing alignment pins and said front mask comprises at least the same number of alignment holes for receiving said alignment pins to assure proper alignment of said guide plate channels with respective front mask openings.

30. An optical fiber array as according to claim 25 wherein said housing encloses said mounting block and all of said guide plates.

31. An optical fiber array according to claim 30 wherein bonding material fills substantially all spaces within the housing around the guide plates and fibers.

32. An optical fiber array according to claim 24 further comprising a support mask for providing fore and aft structural support to said front mask during grinding or polishing of the front mask forward surface or a layer of material thereon, said support mask being secured between the rear surface of said front mask and the housing front surface.

33. An optical fiber array according to claim 24 wherein at least two guide plates comprise forward facing alignment pins and said front mask comprises at least the same number of alignment holes for receiving said alignment pins to assure proper alignment of said guide plate channels with respective front mask openings.

34. A method of constructing a fiber array, the fiber array having a face plate including a plurality of holes and a plurality of stacked plates defining enclosed grooves between respective plate adjacent surfaces to guide fibers, the method comprising:

inserting fibers into and translating fibers through said grooves toward said face plate.

* * * * *